(12) United States Patent
Kim et al.

(10) Patent No.: US 10,769,252 B2
(45) Date of Patent: Sep. 8, 2020

(54) METHOD AND APPARATUS FOR WATERMARKING OF DIGITAL CONTENT, METHOD FOR EXTRACTING INFORMATION

(71) Applicant: MARKANY INC., Seoul (KR)

(72) Inventors: So Won Kim, Seoul (KR); Ji Seop Moon, Seoul (KR); Min Soo Park, Seoul (KR); Hyungyu Kim, Seoul (KR); Euee Seon Jang, Seoul (KR)

(73) Assignee: MARKANY INC., Seoul ( * ) Notice: Subject to any disclaimer, the term of this patent is extended or adjusted under 35 U.S.C. 154(b) by 276 days.

(21) Appl. No.: 15/925,774

(22) Filed: Mar. 20, 2018

(65) Prior Publication Data

US 2019/0294761 A1    Sep. 26, 2019

(51) Int. Cl.
*G06F 21/16* (2013.01)
*H04L 9/08* (2006.01)
*H04L 9/32* (2006.01)

(52) U.S. Cl.
CPC ............ *G06F 21/16* (2013.01); *H04L 9/0825* (2013.01); *G06F 2221/0737* (2013.01); *H04L 9/3263* (2013.01)

(58) Field of Classification Search
CPC ............. G06F 21/16; G06F 2221/0737; H04L 9/0825; H04L 9/3263
See application file for complete search history.

(56) References Cited

U.S. PATENT DOCUMENTS

| | | | | |
|---|---|---|---|---|
| 6,131,162 A | * | 10/2000 | Yoshiura | H04N 21/2541 713/176 |
| 8,171,561 B2 | * | 5/2012 | Moskowitz | G06F 21/10 726/26 |
| 10,102,351 B2 | * | 10/2018 | Zweig | G06F 21/10 |
| 2001/0051996 A1 | * | 12/2001 | Cooper | G06Q 10/10 709/217 |
| 2003/0204729 A1 | * | 10/2003 | Rockwood | G06F 21/10 713/176 |
| 2006/0101269 A1 | * | 5/2006 | Moskowitz | G06Q 30/0283 713/176 |
| 2007/0233602 A1 | * | 10/2007 | Zweig | G06F 21/10 705/51 |
| 2008/0040609 A1 | * | 2/2008 | Giobbi | H04W 12/06 713/182 |
| 2009/0089427 A1 | * | 4/2009 | Moskowitz | G06F 21/10 709/225 |
| 2010/0008500 A1 | * | 1/2010 | Lisanke | H04L 63/0428 380/201 |

(Continued)

*Primary Examiner* — J. Brant Murphy
*Assistant Examiner* — Stephen T Gundry
(74) *Attorney, Agent, or Firm* — Invenstone Patent, LLC (57) ABSTRACT

A method and apparatus for watermarking digital content and a data extraction method are disclosed. The digital content watermarking method includes: generating private and public keys corresponding to the user terminal; generating watermark data containing user identity information corresponding to the user terminal and user details associated with the watermark data; generating encrypted data by encrypting the watermark data and the user details with the private key; transmitting the watermark data, the encrypted data, and the public key to a server; receiving digital content when authorized by the server; and watermarking the digital content with the watermark data.

10 Claims, 7 Drawing Sheets

(56) References Cited

U.S. PATENT DOCUMENTS

| | | | |
|---|---|---|---|
| 2010/0082478 A1* | 4/2010 | Van Der Veen | G06F 21/10 705/39 |
| 2010/0150395 A1* | 6/2010 | Davis | H04L 67/2828 382/100 |
| 2010/0241863 A1* | 9/2010 | Giraud | G06F 21/10 713/176 |
| 2011/0055585 A1* | 3/2011 | Lee | H04L 9/0844 713/183 |
| 2011/0185179 A1* | 7/2011 | Swaminathan | G06F 21/10 713/176 |
| 2013/0132727 A1* | 5/2013 | Petrovic | G06F 16/71 713/176 |
| 2014/0149395 A1* | 5/2014 | Nakamura | G06F 21/16 707/722 |
| 2015/0121082 A1* | 4/2015 | Carapelli | G09C 5/00 713/176 |
| 2016/0070892 A1* | 3/2016 | Leonard | G06F 21/16 726/26 |
| 2016/0088366 A1* | 3/2016 | Hunacek | H04N 21/4405 725/31 |
| 2017/0116693 A1* | 4/2017 | Rae | G06Q 20/3827 |
| 2017/0208045 A1* | 7/2017 | Huh | H04L 9/3247 |
| 2017/0334234 A1* | 11/2017 | Curtis | B42D 25/333 |
| 2017/0353745 A1* | 12/2017 | Karkkainen | H04N 21/23476 |
| 2019/0132652 A1* | 5/2019 | Zhao | H04N 21/2389 |

\* cited by examiner

METHOD AND APPARATUS FOR WATERMARKING OF DIGITAL CONTENT, METHOD FOR EXTRACTING INFORMATION

BACKGROUND OF THE INVENTION

Field of the Invention

The present invention relates to a method and apparatus for watermarking digital content and a data extraction method, and more particularly, to a method and apparatus for watermarking digital content that allow for recording and extracting various user tracking information on digital content and can greatly improve data security, and a data extraction method that allows for extracting data from a watermark in digital content.

Related Art

In general, digital content such as images, video, and multimedia can be quickly copied and transferred over a network, which facilitates file sharing and distribution between users. Thus, digital content by its nature is vulnerable to copy protection cracking. For example, digital data can be copied in large quantities without restriction in an open space like the internet where data is easily produced and transformed, and a copy still contains the same data as the original and can be distributed without the copyright owner's permission, making copyright protection difficult.

Such copyright infringement is becoming increasingly serious, and many legal, policy, and technical solutions have been proposed to combat copyright infringement. For instance, watermarking is the technology of embedding copyright information of the owner as a watermark, which is not perceptible by human beings, into digital content and identifying the embedded watermark by a detector, which allows the copyright owner to claim owner of the digital content. Using watermarking technology, information of the copyright ownership or distributor can be embedded into digital content and used to prove them right in possible future intellectual property disputes.

Particularly, forensic watermarking is the technology of tracing back to the source of leaked digital content by embedding purchaser information, a distribution route, user information, etc. into the digital content. Forensic watermarking provides post-detection capabilities such as allowing a seller of digital content to identify the original purchaser if copies of the digital content are pirated, which provides protection to keep the original purchaser from illegally distributing the digital content.

In forensic watermarking, a watermark has to contain user tracking information such as personal information or purchase details, in order to trace users of digital content. However, it is not practically possible to embed a large amount of information as a watermark because the watermark has limited information capacity. For example, in a conventional forensic watermarking system, a watermark may contain approximately 40 to 70 bits of data, which is a minimum of information like a user ID or payment information. Therefore, there is a need for a forensic watermarking technology that can store and manage large volumes of user tracking information.

In forensic watermarking, a method for managing user tracking information based on a database server may be proposed. In this case, however, there is a possibility that data recorded in the database might be forged or tampered. Accordingly, there is an urgent need for the development of a new technology that can record and manage large volumes of information for user tracking and guarantee the prevention of forgery and tampering of the database.

SUMMARY OF THE INVENTION

In view of the above background, the present invention has been made in an effort to provide a method and apparatus for watermarking digital content that allow for recording and extracting various user tracking information in digital content and can greatly improve data security.

The present invention provides a data extraction method based on a watermark embedded in digital content that allows for extracting data from a watermark in digital content if the digital content is illegally leaked.

In one aspect of the present invention, a watermarking method performed by a user terminal may include: generating private and public keys corresponding to the user terminal; generating watermark data containing user identity information corresponding to the user terminal and user details associated with the watermark data; generating encrypted data by encrypting the watermark data and the user details with the private key; transmitting the watermark data, the encrypted data, and the public key to a server; receiving digital content when authorized by the server; and watermarking the digital content with the watermark data.

The user identity information may include a user ID corresponding to the user terminal, and the user details may include at least one among the user's payment details and credit card information for the digital content and the hardware information of the user terminal. The digital content watermarking method may further include discarding the private key after generating encrypted data.

The server may store the transmitted watermark data, encrypted data, and public key in the same way in a plurality of databases, respectively. A different retention period may be set for each database, and the data stored in each database may be discarded when the retention period expires.

The server may store the transmitted watermark data, encrypted data, and public key in the same way in a plurality of closed blockchains, respectively. A different retention period may be set for each database, and the data stored in each blockchain may be discarded when the retention period expires.

In the digital content watermarking method, the transmission of the watermark data, encrypted data, and public key from the user terminal to the server may be authorized by a third-party or a third-party certificate.

In another aspect of the present invention, a digital content watermarking apparatus may include: a key generator that generates private and public keys corresponding to the user terminal; a data generator that generates watermark data containing user identity information corresponding to the user terminal and user details associated with the watermark data; an encryption part that generates encrypted data by encrypting the watermark data and the user details with the private key; a data transmitter that transmits the watermark data, the encrypted data, and the public key to a server; and a watermark embedder that receives digital content when authorized by the server and watermarks the digital content with the watermark data.

The user identity information may include a user ID corresponding to the user terminal, and the user details may include at least one among the user's payment details and credit card information for the digital content and the hardware information of the user terminal. The digital content watermarking method may further include discarding the private key after generating encrypted data.

The server may store the transmitted watermark data, encrypted data, and public key in the same way in a plurality of databases, respectively. A different retention period may be set for each database, and the data stored in each database may be discarded when the retention period expires.

The server may store the transmitted watermark data, encrypted data, and public key in the same way in a plurality of closed blockchains, respectively. A different retention period may be set for each database, and the data stored in each blockchain may be discarded when the retention period expires.

In another aspect of the present invention, a data extraction method may include: extracting first watermark data from a watermark embedded in digital content; extracting second watermark data from a database or blockchain by searching the database or blockchain using the first watermark data; decrypting encrypted data associated with the second watermark data using a public key associated with the second watermark data; extracting third watermark data contained in the decrypted data; comparing the first watermark data, second watermark data, and third watermark data, and, if all of the data matches, extracting user details contained in the encrypted data.

As explained above, according to the present invention, a minimum of information for identifying digital content may be watermarked and embedded into the digital content, and user details may be encrypted and stored in a plurality of databases or blockchains. Accordingly, it is possible to store and manage large volumes of information for user tracking while reducing watermarking time and ensuring security.

DESCRIPTION OF EXEMPLARY
EMBODIMENTS

Hereinafter, an exemplary embodiment of the present invention will be described in further details with reference to the accompanying drawings. In order to help overall understanding, the same reference numerals designate the same elements throughout the drawings, and a redundant description of the same elements is omitted.

Figure 1:
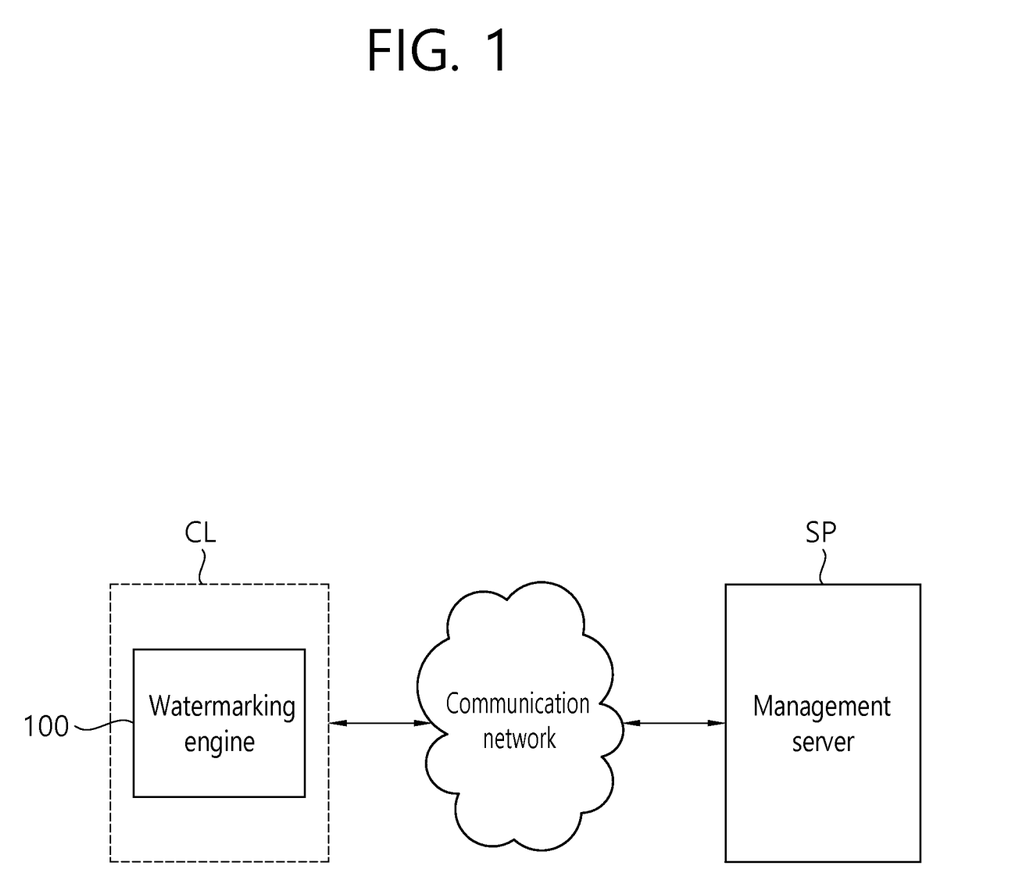
FIG. 1 is a block diagram of the configuration of a system for implementing a digital content watermarking method according to an exemplary embodiment of the present invention.

FIG. 1 is a block diagram of the configuration of a system for implementing a digital content watermarking method according to an exemplary embodiment of the present invention.

As shown in FIG. 1, a user terminal CL may interface with a management server SP. The user terminal CL may refer to a network device where digital content can be purchased or can be downloaded for use. For example, the user terminal CL may be a set-top box, a smart TV, a mobile terminal, a personal computer, etc. The digital content may be copyrighted multimedia content, images, etc.

The user terminal CL may have a watermarking engine 100. The watermarking engine 100 may be a device that is installed as software on the user terminal CL and operates based on the hardware resources of the user terminal CL, such as a processor, memory, etc., or may be a device that is implemented in hardware within the user terminal CL.

Figure 2:
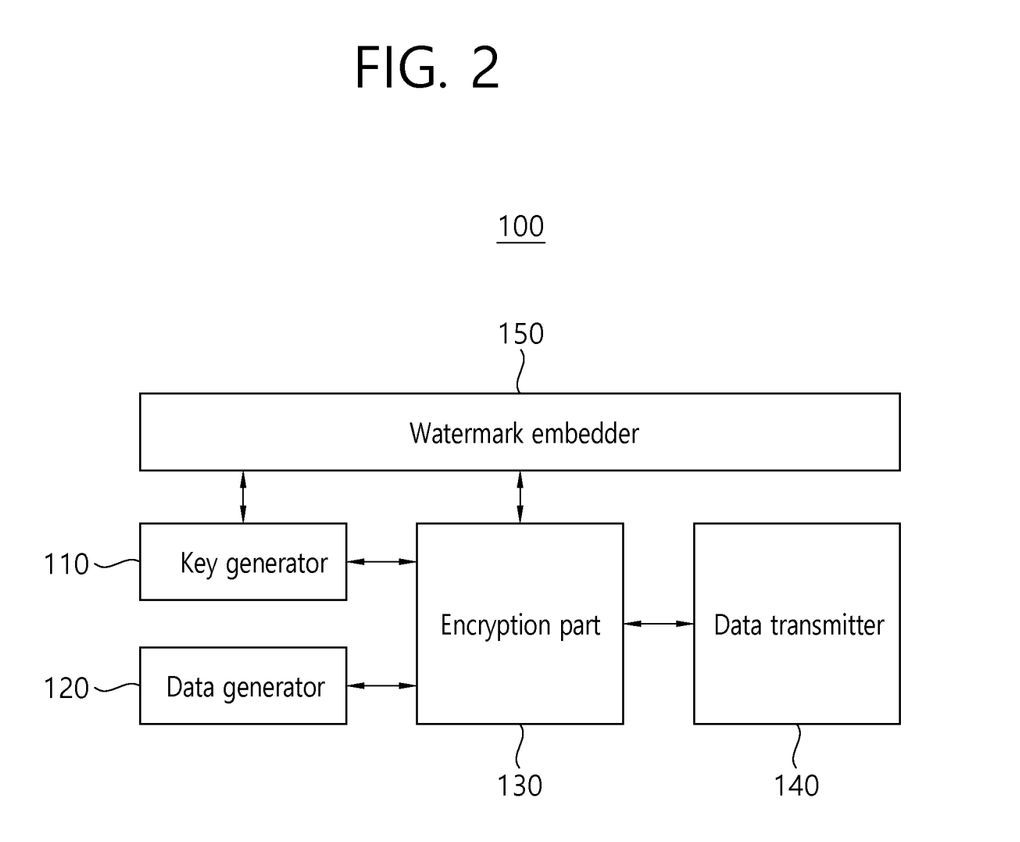
FIG. 2 is a block diagram of the configuration of a watermarking engine shown in FIG. 1.

FIG. 2 is a block diagram of the configuration of the watermarking engine 100 shown in FIG. 1.

As shown in FIG. 2, the watermarking engine 100 may include a key generator 110, a data generator 120, an encryption part 130, an data transmitter 140, and a watermark embedder 150. Each of these components may work in conjunction with one another by sending and receiving signals as required for a process.

The key generator 110 may generate private and public keys corresponding to the user terminal CL. The data generator 120 may generate watermark data containing user identity information corresponding to the user terminal CL and user details associated with the watermark data. The encryption part 130 may generate encrypted data by encrypting the watermark data and the user details with the private key. The data transmitter 140 may transmit the watermark data, the encrypted data, and the public key to a server. When authorized by the server, the watermark embedder 150 may receive digital content and watermark the digital content with the watermark data.

Figure 3:
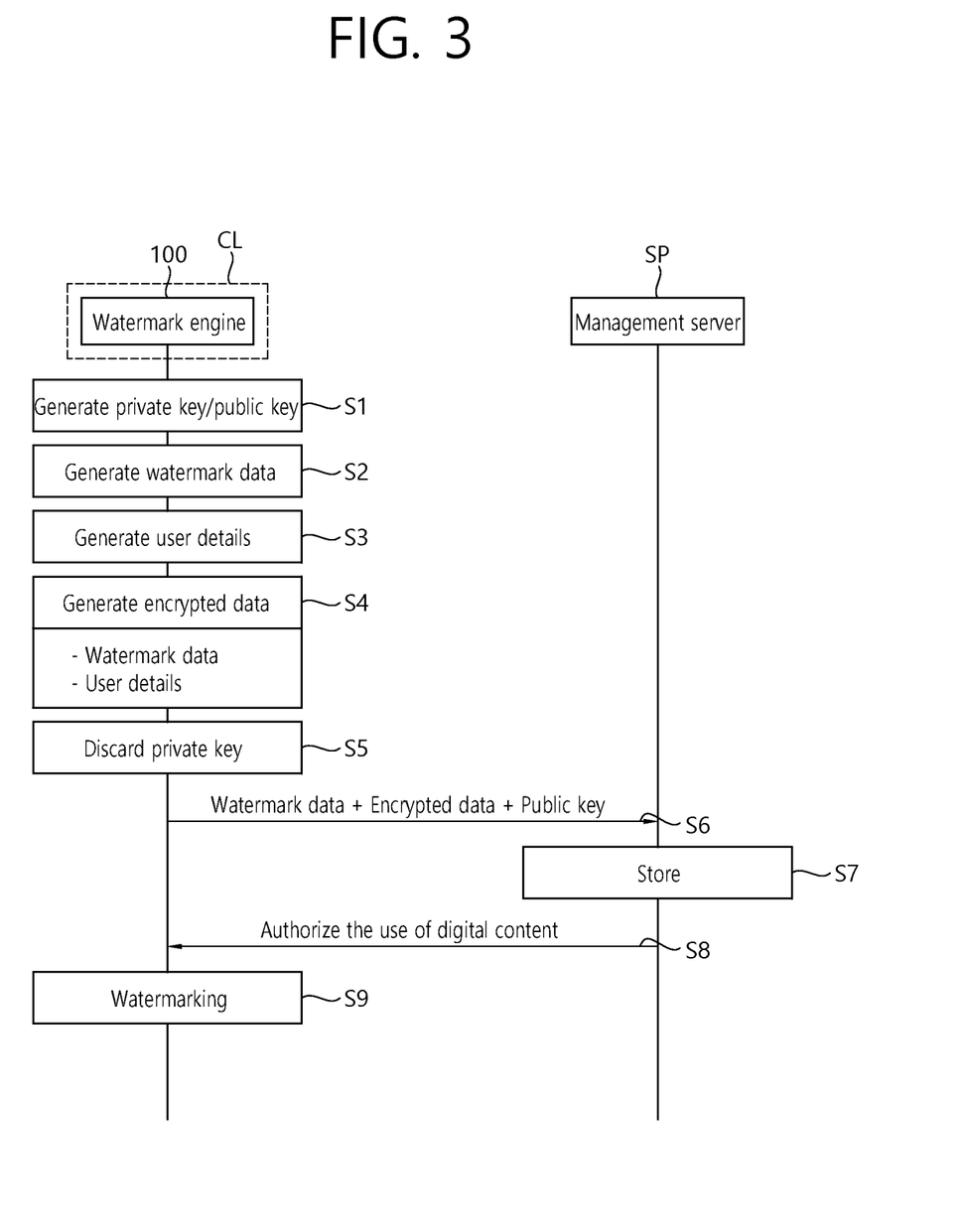
FIG. 3 is a flowchart illustrating a method for watermarking digital content according to an exemplary embodiment of the present invention.

FIG. 3 is a flowchart illustrating a method for watermarking digital content according to an exemplary embodiment of the present invention. Below is a description of an operation based on the system and machine respectively shown in FIGS. 1 and 2. In what follows, the roles and interactions of the components mentioned with respect to FIGS. 1 and 2 will be clarified.

First of all, the user terminal CL may connect to a content market over a communication network and purchase digital content. The content market may be a market interfacing with the management server SP. For example, the management server SP may confirm that a watermarking process is being performed properly on digital content, and, if properly done, may authorize the transmission of the digital content to the person who purchased it.

Referring to FIGS. 1 to 3, when the user terminal CL purchases digital content, the key generator 110 of the watermark engine 100 on the user terminal CL may generate private and public keys corresponding to the user terminal CL (Step S1).

Moreover, the data generator 120 of the watermarking engine 100 may generate watermark data (Step S2). The watermark data may be a minimum of information, e.g., a user ID, used to uniquely identify the user terminal CL. Here, the user terminal CL may be in a logged-in state based on a specific user ID. Alternatively, the watermark data may be the hardware identification information, MAC (media access control) address, etc. of the user terminal CL.

The data generator 120 of the watermarking engine 100 may generate user details associated with the watermark data (Step S3). The user details may include the user's usage details of the digital content. For example, the user details may include the user's payment details and credit card information for the purchase of the digital content. The user details may further include the hardware information or MAC address of the user terminal CL.

Next, the encryption part 130 of the watermarking engine 100 may generate encrypted data by encrypting watermark data and user details with the private key generated by the key generator 110 (Step S4). That is, the encrypted data may refer to data generated by encrypting the watermark data and the user details with the private key.

Meanwhile, the encryption part 130 may generate hash codes or error-correcting codes ECC for the watermark data and user details and encrypt the generated hash codes or error-correcting codes, in order to enhance the capabilities for preventing the forgery or tampering of the watermark data and user details. In this case, the encrypted data may include the watermark data, the user details, and the hash codes or error-correcting codes.

Upon completion of the encryption, the encryption part 130 may discard the private key used for the encryption (Step S5).

Figure 4:
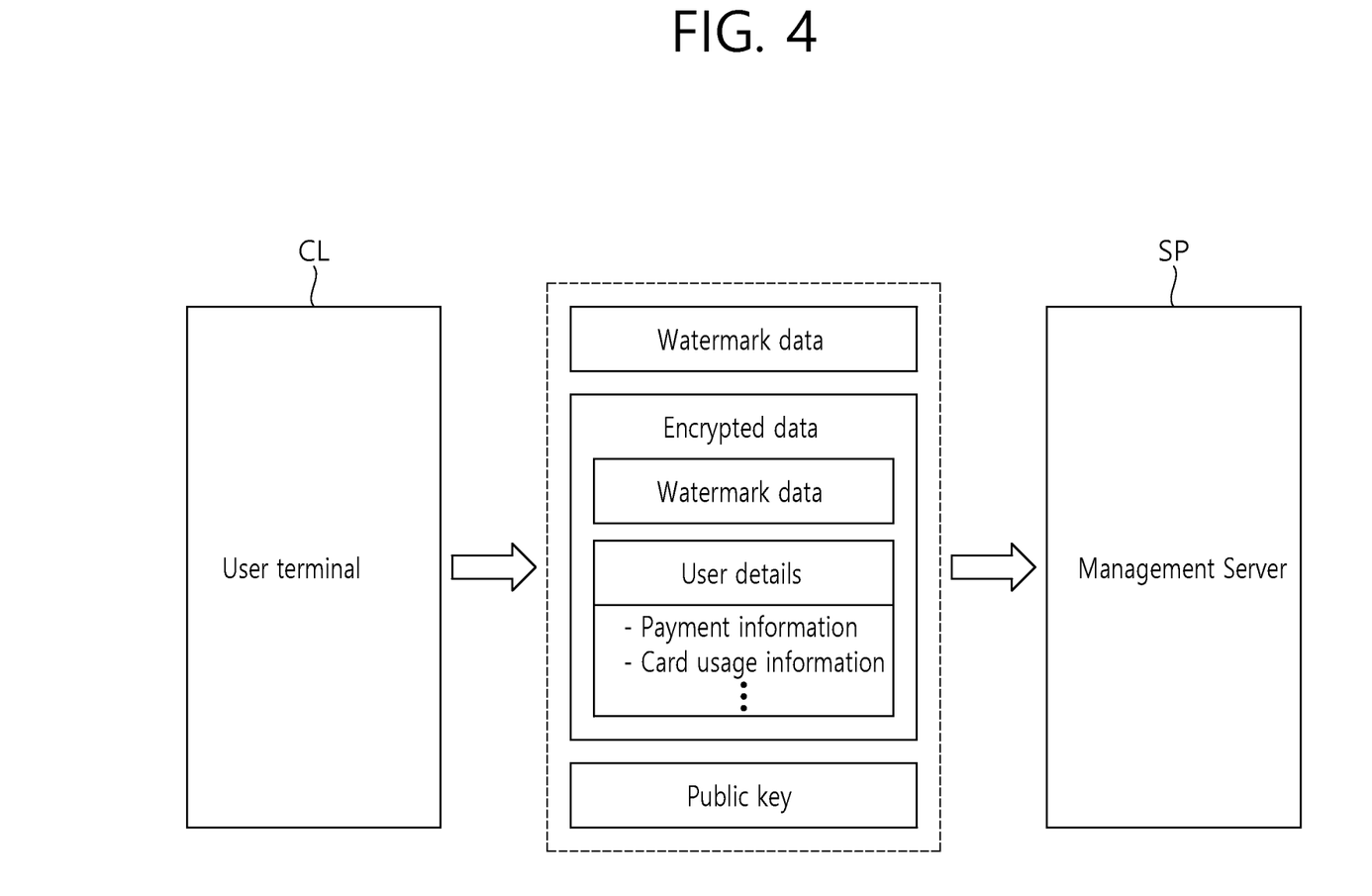
FIG. 4 is an illustration showing data transmitted from a user terminal to a management server.

The data transmitter 140 of the watermarking engine 100 may transmit the watermark data, the encrypted data, and the public key to the server (Step S6). FIG. 4 is an illustration showing data transmitted from the user terminal CL to the management server SP. As shown in FIG. 4, the user terminal CL may transmit to the management server SP non-encrypted watermark data, encrypted data (i.e., data generated by encrypting the watermark data and the user details with the private key), and the public key.

When transmitting the watermark data, encrypted data, and public key, a security protocol may be used between the user terminal CL and the server. Moreover, the transmission of the watermark data, encrypted data, and public key from the user terminal CL to the management server SP may be authorized by a third party or a third-party certificate, e.g., an authentication server. For instance, a security communication protocol using a secure form of third-party certification may be used for communication between the user terminal CL and the management server SP.

Meanwhile, the management server SP may receive and store the watermark data, encrypted data, and public key transmitted from the user terminal CL (Step S7). The management server SP may store the watermark data, encrypted data, and public key using a plurality of databases or a plurality of block chains.

Figure 5:
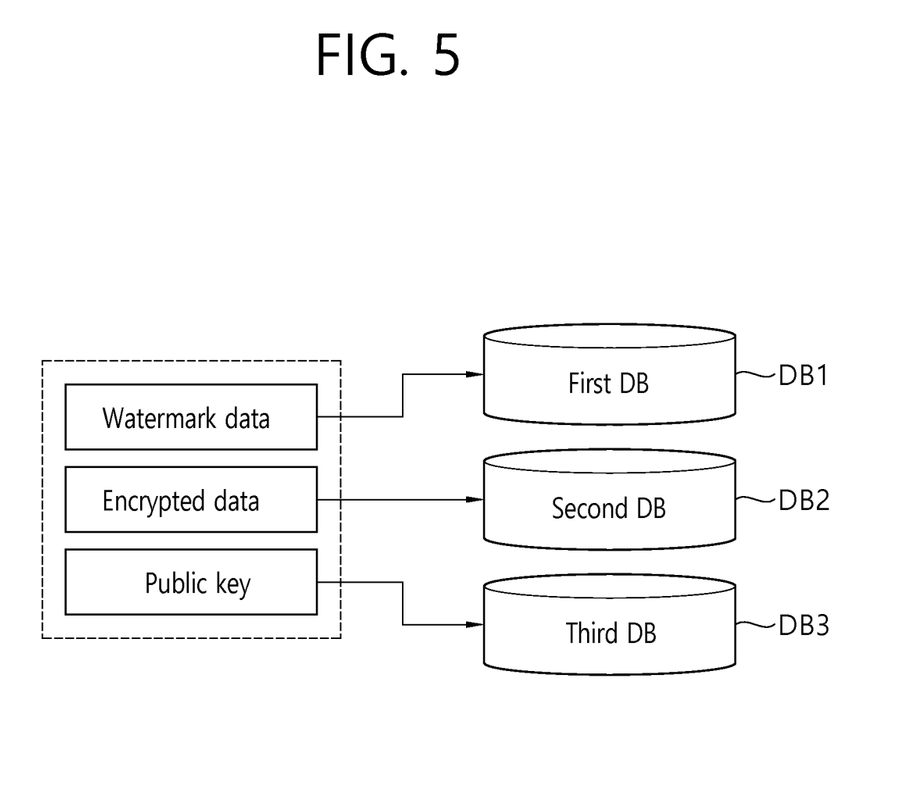
FIG. 5 is an illustration showing a structure for storing watermark data, encrypted data, and a public key using databases.

FIG. 5 is an illustration showing a structure for storing watermark data, encrypted data, and a public key using databases.

As shown in FIG. 5, the management server SP may store watermark data, encrypted data, and a public key using a plurality of databases—for example, a first database DB1, a second database DB2, and a third database DB3. The watermark data, encrypted data, and public key may be stored in the same way in the first database DB1, second database DB2, and third database DB3, respectively. In this case, the watermark data, encrypted data, and public key stored in their respective databases may be compared to one another. If they match, it is determined that data integrity is verified, and the verified data may be stored. Therefore, the integrity of the data stored in the plurality of databases may be verified.

Meanwhile, the data stored in the databases might need to be deleted after a given period of time according to a policy such as a personal data retention period. To this end, a different retention period is set for each database, and the data stored in each database may be discarded when the retention period expires.

For example, the first database DB1 may be retained until May 31, 2018, the second database DB2 may be retained until Jun. 30, 2018, and the third database DB3 may be retained until Sep. 30, 2018, and the data stored in each database may be physically or logically discarded when the set retention period expires. Here, the term "physical discarding" may refer to discarding the database from the system using a physical method, like removing the hardware storing the database, and the term "logical discarding" may refer to deleting the data in the database or deleting a link to the database.

Figure 6:
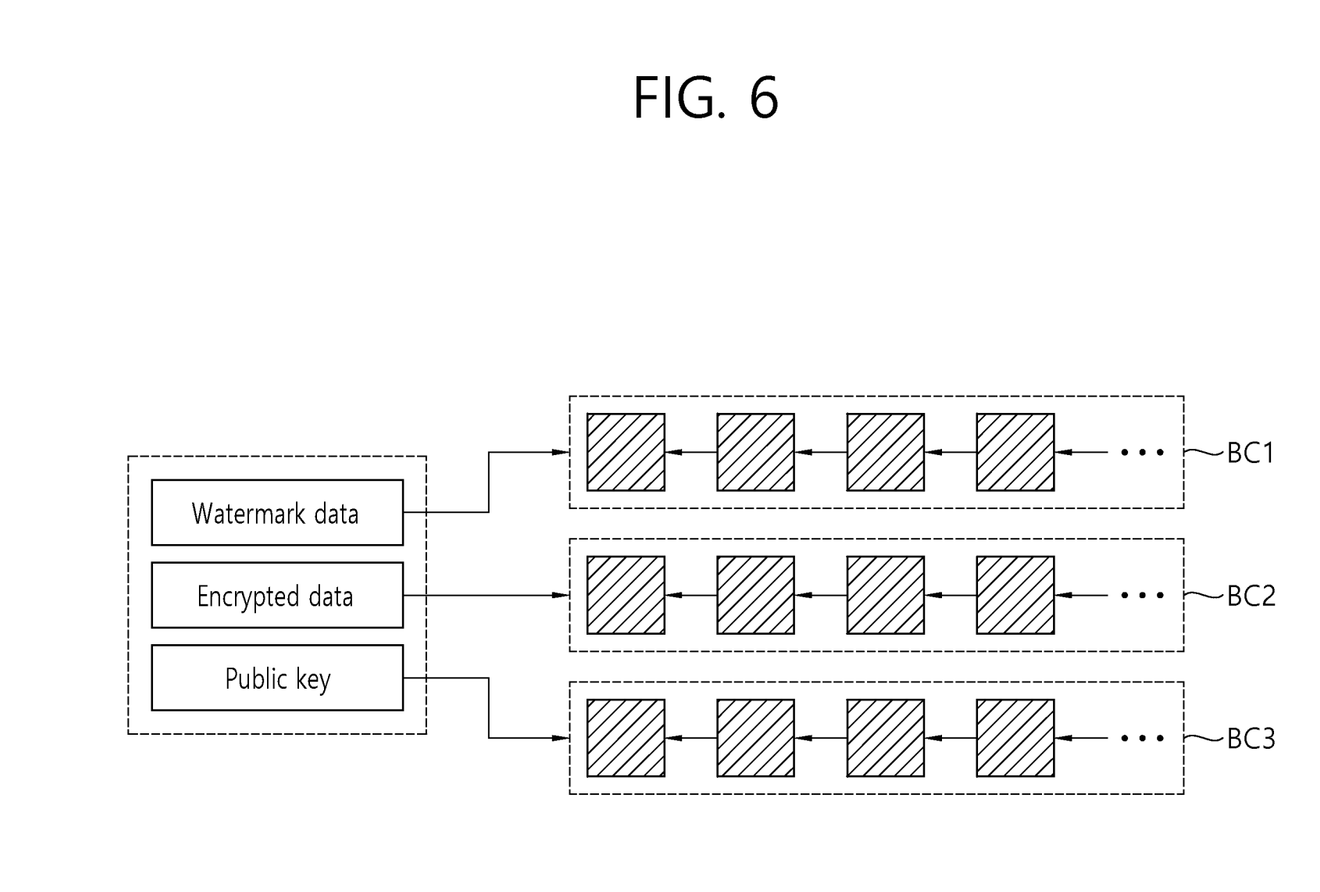
FIG. 6 is an illustration showing a structure for storing watermark data, encrypted data, and a public key using block chains.

FIG. 6 is an illustration showing a structure for storing watermark data, encrypted data, and a public key using block chains.

As shown in FIG. 6, the management server SP may store watermark data, encrypted data, and a public key using a plurality of block chains—for example, a first blockchain BC1, a second blockchain BC2, and a third block chain BC3. The watermark data, encrypted data, and public key may be included in blocks produced in the blockchains and stored in the same way in the first blockchain BC1, second blockchain BC2, and third blockchain BC3, respectively. In this case, the watermark data, encrypted data, and public key, which are included in the blocks connected to each other that are produced in the blockchains, may be compared to one another. If they match, it is determined that data integrity is verified, and the verified data may be stored. Therefore, the integrity of the data stored in the plurality of blockchains may be verified.

Meanwhile, the data stored in the blockchains might need to be deleted after a given period of time according to a policy such as a personal data retention period. To this end, a different retention period is set for each database, and the data stored in each blockchain may be discarded when the retention period expires.

For example, the first blockchain BC1 may be retained until May 31, 2018, the second blockchain BC2 may be retained until Jun. 30, 2018, and the third blockchain BC3 may be retained until Sep. 30, 2018, and the data stored in each blockchain may be physically or logically discarded when the set retention period expires. Here, the term "physical discarding" may refer to discarding the blockchain from the system using a physical method, like removing the hardware for nodes in the blockchain, and the term "logical discarding" may refer to deleting the data in the blockchain or deleting a link to the blockchain.

Once the watermark data, encrypted data, and public key are stored, the management server SP may send to the content market an authorization for the transmission of the digital content purchased on the user terminal CL to the user terminal CL and send the user terminal CL an authorization for the use of the digital content (Step S8).

Upon receiving the authorization, the watermark embedder 150 of the watermarking engine 100 may receive the digital content and then watermark the digital content with the watermark data (Step S9). More specifically, the watermark embedder 150 may generate watermarked digital content by generating a watermark based on the watermark data and embedding the generated watermark into the digital content.

Upon completion of the watermarking, the user terminal CL may reproduce the watermarked digital content through the user terminal CL or transfer it to an authorized device within legal bounds. However, if the watermarked digital content is illegally leaked, the management server SP may perform user tracking to trace back to the source of the watermarked digital content that has been illegally leaked.

Figure 7:
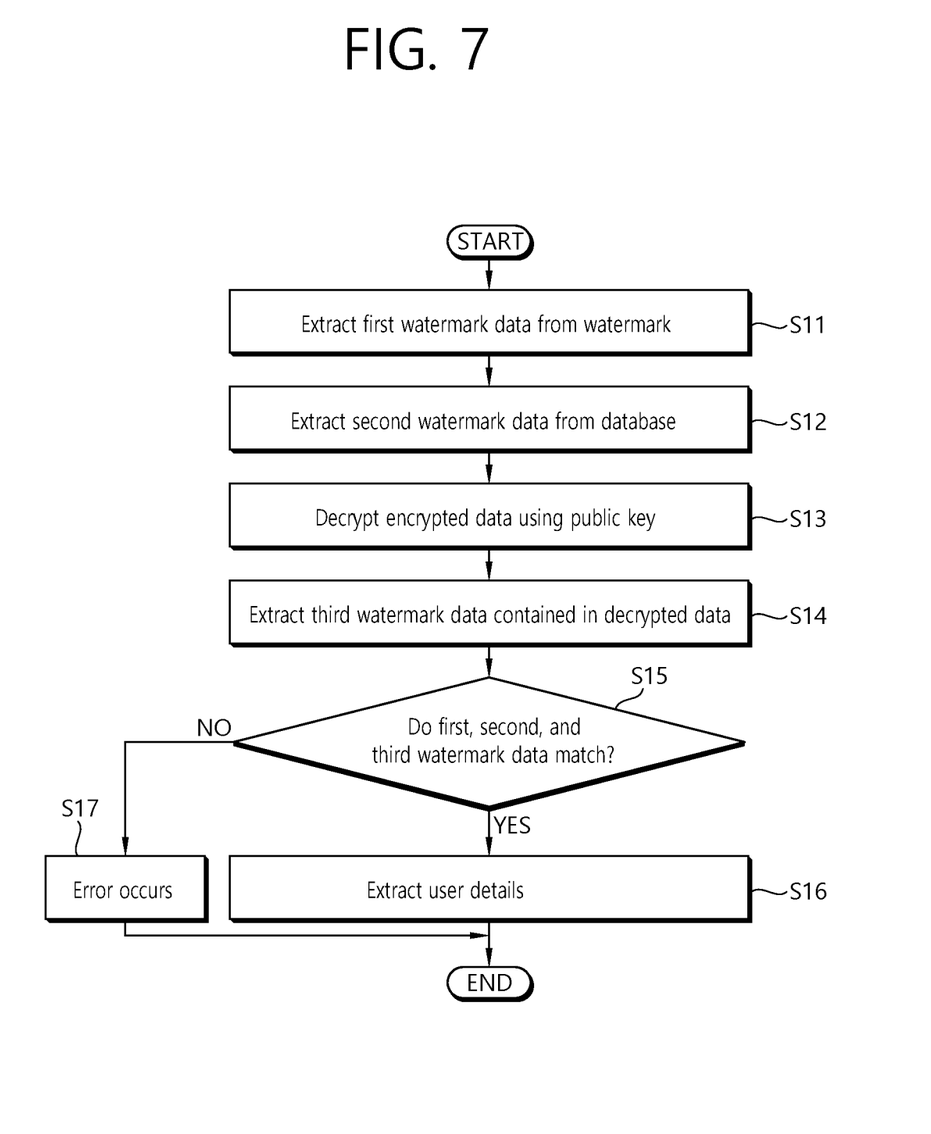
FIG. 7 is a flowchart of a process for extracting user details based on a watermark embedded in digital content.

FIG. 7 is a flowchart of a process for extracting user details based on a watermark embedded in digital content.

As shown in FIG. 7, the management server SP may extract watermark data from a watermark embedded in watermarked digital content that has been leaked (Step S11). The watermark data extracted from the watermark embedded in the digital content may be called first watermark data.

Then, the management server SP may extract second watermark data from a database or blockchain by searching the database or blockchain using the first watermark data (Step S12). That is, watermark data matching the first watermark data may be detected by searching a database or blockchain. Here, the watermark data detected in the database may be called second watermark data.

Next, the management server SP may decrypt encrypted data associated with the second watermark data using a public key associated with the second watermark data (Step S13). As mentioned above, the encrypted data contains watermark data and user details.

Accordingly, the management server SP may extract the watermark data contained in the decrypted data (Step S14). The watermark data contained in the decrypted data may be called third watermark data.

The management server SP may compare the first watermark data, second watermark data, and third watermark data (Step S15). If all of the first watermark data, second watermark data, and third watermark data match, the management server SP may determine that the integrity of the watermark data is verified, and extract user details contained in the encrypted data. Therefore, the management server SP may detect the user who leaked the digital content, based on the user details.

On the other hand, if the first watermark data, second watermark data, and third watermark data do not match, the management server SP may determine that at least one of the watermark data has been forged or tampered and issue an error (Step S17).

As explained above, according to an exemplary embodiment of the present invention, a minimum of information for identifying digital content may be watermarked and embedded into the digital content, and user details may be encrypted and stored in a plurality of databases or blockchains. Accordingly, it is possible to store and manage large volumes of information for user tracking while reducing watermarking time and ensuring security.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

What is claimed is:

1. A watermarking method performed by a user terminal, the method comprising:
    generating private and public keys corresponding to the user terminal;
    generating watermark data containing user identity information corresponding to the user terminal and user details associated with the watermark data;
    generating encrypted data by encrypting the watermark data and the user details with the private key;
    transmitting the watermark data, the encrypted data, and the public key to a server;
    receiving digital content when authorized by the server; and
    watermarking the digital content with the watermark data,
    wherein the server stores the transmitted watermark data, encrypted data, and public key in the same way in a plurality of databases, respectively, and
    wherein a different retention period is set for each database, and the data stored in each database is discarded when the retention period expires.

2. The watermarking method of claim 1, wherein the user identity information comprises a user ID corresponding to the user terminal, and the user details comprise at least one among the user's payment details and credit card information for the digital content and the hardware information of the user terminal.

3. The watermarking method of claim 1, further comprising discarding the private key after generating encrypted data.

4. The watermarking method of claim 1, wherein the transmission of the watermark data, encrypted data, and public key from the user terminal to the server is authorized by a third-party or a third-party certificate.

5. A watermarking apparatus comprising:
    a key generator that generates private and public keys corresponding to the user terminal;
    a data generator that generates watermark data containing user identity information corresponding to the user terminal and user details associated with the watermark data;
    an encryption part that generates encrypted data by encrypting the watermark data and the user details with the private key;
    a data transmitter that transmits the watermark data, the encrypted data, and the public key to a server; and
    a watermark embedder that receives digital content when authorized by the server and watermarks the digital content with the watermark data,
    wherein the server stores the transmitted watermark data, encrypted data, and public key in the same way in a plurality of databases, respectively, and
    wherein a different retention period may be set for each database, and the data stored in each database is discarded when the retention period expires.

6. The watermarking apparatus of claim 5, wherein the user identity information comprises a user ID corresponding to the user terminal, and the user details comprise at least one among the user's payment details and credit card information for the digital content and the hardware information of the user terminal.

7. The watermarking apparatus of claim 5, wherein the encryption part discards the private key after generating encrypted data.

8. The watermarking apparatus of claim 5, wherein the transmission of the watermark data, encrypted data, and public key from the user terminal to the server is authorized by a third-party or a third-party certificate.

9. A watermarking method performed by a user terminal, the method comprising:
    generating private and public keys corresponding to the user terminal;
    generating watermark data containing user identity information corresponding to the user terminal and user details associated with the watermark data;
    generating encrypted data by encrypting the watermark data and the user details with the private key;
    transmitting the watermark data, the encrypted data, and the public key to a server;
    receiving digital content when authorized by the server; and watermarking the digital content with the watermark data, wherein the server stores the transmitted watermark data, encrypted data, and public key in the same way in a plurality of closed blockchains, respectively, and wherein a different retention period is set for each database, and the data stored in each blockchain is discarded when the retention period expires.

10. A watermarking apparatus comprising:

a key generator that generates private and public keys corresponding to the user terminal;

a data generator that generates watermark data containing user identity information corresponding to the user terminal and user details associated with the watermark data;

an encryption part that generates encrypted data by encrypting the watermark data and the user details with the private key;

a data transmitter that transmits the watermark data, the encrypted data, and the public key to a server; and a watermark embedder that receives digital content when authorized by the server and watermarks the digital content with the watermark data, wherein the server stores the transmitted watermark data, encrypted data, and public key in the same way in a plurality of closed blockchains, respectively, wherein a different retention period may be set for each database, and the data stored in each blockchain is discarded when the retention period expires.

* * * * *